United States Patent [19]

Tobias et al.

[11] 4,051,089
[45] Sept. 27, 1977

[54] WATER REDUCIBLE SHORT OIL ALKYD RESINS AND PROCESS OF MAKING SAME

[75] Inventors: Michael A. Tobias, Somerville; Carlos J. Martinez, Edison, both of N.J.

[73] Assignee: Mobil Oil Corporation, New York, N.Y.

[21] Appl. No.: 570,340

[22] Filed: Apr. 21, 1975

[51] Int. Cl.$^2$ .......................... C09D 3/64; C09D 3/66
[52] U.S. Cl. ........................ 260/22 R; 260/22 CQ; 260/29.2 E; 260/29.2 UA; 428/458
[58] Field of Search ........ 260/22 R, 29.2 E, 29.2 UA, 260/22 CQ

[56] References Cited

U.S. PATENT DOCUMENTS

| | | | |
|---|---|---|---|
| 2,634,245 | 4/1953 | Arndt | 260/22 R |
| 3,001,961 | 9/1961 | Armitage et al. | 260/22 R |
| 3,077,459 | 2/1963 | Hershey et al. | 260/22 R |
| 3,223,659 | 12/1965 | Curtice et al. | 260/22 R |
| 3,224,992 | 12/1965 | Stephens | 260/22 R |
| 3,297,605 | 1/1967 | Schroeder et al. | 260/29.2 UA |
| 3,310,512 | 3/1967 | Curtice | 260/29.2 E |
| 3,379,548 | 4/1968 | Jen | 260/22 R |
| 3,437,615 | 4/1969 | Hanson | 260/21 |

*Primary Examiner*—Ronald W. Griffin
*Attorney, Agent, or Firm*—Charles A. Huggett; Hastings S. Trigg

[57] ABSTRACT

Water reducible alkyd resin composition comprising the reaction product of from about 10-15 wt. %, based on total weight of reactants, of a polyethylene glycol, from about 20-25 wt. % of a triglyceride, e.g., soya oil, based on total wt. % of reactants, from about 18 to 23 wt. %, based on total weight of reactants, of a polyol, e.g., glycerine, and from about 43-48 wt. %, based on total weight of reactants, of an aromatic dicarboxylic acid, e.g., isophthalic, and process of making same; said alkyd resin being highly useful for coating formulations.

12 Claims, No Drawings

WATER REDUCIBLE SHORT OIL ALKYD RESINS AND PROCESS OF MAKING SAME

BACKGROUND OF THE INVENTION

This invention relates to novel water reducible short oil alkyd resin compositions and to a process of making same. More particularly, this invention is directed to water reducible short oil alkyd resins comprising the reaction product of a polyethylene glycol, a triglyceride, a polyol, and an aromatic dicarboxylic acid. This invention further relates to the use of the herein disclosed novel alkyd resins as superior quality coatings either alone or in suitable blends and articles coated therewith.

No prior art practices are known to applicants wherein water reducible short oil alkyd resins are prepared using selected polyethylene glycols to control molecular weight, promote excellent solubility and solution stability of water reducible short oil alkyd resin compositions.

DESCRIPTION OF THE INVENTION

In accordance with this invention, water reducible short oil alkyd resins and a process of preparing same are provided wherein said resins are the reaction product of a polyethylene, glycol, a triglyceride, a polyol and an aromatic dicarboxylic acid or anhydride. More specifically, the alkyd resin compositions disclosed herein comprise from about 10-15 wt. %, based on the total weight of the reactants, of the polyethylene glycol; from about 20-25 wt. %, based on the total weight of the reactants, of the triglyceride; from about 18-23 wt. %, based on the total weight of reactants, of a polyol and from about 43-48 wt. %, based on the total weight of the reactants, of an aromatic dicarboxylic acid or anhydride. The final polymer based on the above-described reactants should preferably have an alcoholic acid number in the range of from about 45 to about 65. Additionally, the final polymer may be neutralized or partially neutralized by any suitable means, e.g., by triethylamine.

Polyethylene glycols suitable for use in this invention are commercially obtainable, e.g., Carbowax Polyethylene Glycols, or Polyglycol/Polyethylene Glycols. Such glycols having a molecular weight from about 200–2000 are preferred; especially preferred are those within the molecular weight range of from about 350–1500.

Representative Carbowax Polyethylene Glycols are described in the Table A below:

TABLE A

| GENERAL STRUCTURAL FORMULA-CARBOWAX POLYETHYLENE GLYCOL HOCH$_2$CH$_2$O(CH$_2$CH$_2$O)$_n$H (n averages 3-165) | FORMULA MOLECULAR WEIGHT/RANGE | APARENT SPECIFIC GRAVITY 20/20° C | FREEZING RANGE ° C | WATER SOLUBILITY AT 20° C., % BY Wt. |
|---|---|---|---|---|
| polyethylene Glycol 200 | 190–210 | 1.1266 | (l) | Complete |
| Polyethylene Glycol 300 | 285–315 | 1.125 | −15 to −8 | Complete |
| Polyethylene Glycol 400 | 380–420 | 1.1281 | 4 to 8 | Complete |
| Polyethylene Glycol 600 | 570–630 | 1.1279 | 20 to 25 | Complete |
| Polyethylene Glycol 1000 | 950–1050 | 1.101 (55/20°) | 37 to 40 | 70, appr. |
| Polyethylene Glycol 1500 (n) | 500–600 | 1.151 (o) | 38 to 41 | 73 |
| Polyethylene Glycol 1540 | 1300–1600 | 1.0910 | 43 to 46 | 70 |

| GENERAL STRUCTURAL FORMULA-CARBOWAX POLYETHYLENE GLYCOL HOCH$_2$CH$_2$O(CH$_2$CH$_2$O)$_n$H (n averages 3-165) | VISCOSITY, CENTISTOKES AT 210° F | COMPARATIVE HYGROSCOPICITY (Glycerine =100) | SURFACE TENSION, 25° C DYNES/CM. | REFRACTIVE INDEX, $n_D 25°$ C |
|---|---|---|---|---|
| POLYETHYLENE GLYCOL 200 | 4.3 | 70 | 44.5 | 1.459 |
| Polyethylene Glycol 300 | 5.8 | 65 | 44.5 | 1.463 |
| Polyethylene Glycol 400 | 7.3 | 60 | 44.5 | 1.465 |
| Polyethylene Glycol 600 | 10.5 | 50 | 44.5 | 1.467 |
| Polyethylene Glycol 1000 | 17.4 | 35 | (m) | (m) |
| Polyethylene Glycol 1500 | 13–18 | 35 | (m) | (m) |
| Polyethylene Glycol 1540 | 25–32 | 30 | (m) | (m) |

(l) Sets to glass below −65° C.
(m) Solid at 25° C.
(n) A blend of equal parts of CARBOWAX Polyethylene Glycols 300 & 1540
(o) Density g./ml. at 20° C.

Any suitable triglyceride may be used in the invention. Triglycerides of oleic, palmitic, lauric, linoleic and linolenic acids are suitable. Specially preferred are triglycerides derived from natural sources such as soya oil, safflower oil, tall oil, palm oil and the like. Accordingly, suitable triglycerides have from about 30–60 carbon atoms per molecule ($C_{30}$–$C_{60}$).

Polyols suitable for the invention should preferably contain from about 2 to about 6 hydroxy groups, e.g., glycerine, propylene glycol, trimethlylol ethane, trimethylol propane, pentaerythritiol and the like.

Aromatic dicarboxylic acids or anhydrides may both be advantageously used in these compositions. In general the acid or anhydride should contain from 8–12 carbon atoms, that is it should be a $C_8$–$C_{12}$ dicarboxylic acid or anhydride. Representative compounds are isophthalic, phthalic and terephthalic acids, and phthalic anhydride.

In general, the water reducible short oil alkyd resins embodied in this invention are prepared by placing appropriate amounts of a polyethylene glycol, a polyol and a triglyceride as disclosed in a suitable reaction vessel; applying heat in excess of approximately 200° C; and removing air from the reaction chamber. The reaction may be catalyzed by minor amounts of an alcoholysis catalyst, such as litharge (a fused lead oxide) or lithium hydroxide, using from about 0.005 to about 0.0075 mole which may be conveniently added to the reaction zone after the air purge. The reaction vessel is then cooled prior to adding the aromatic dicarboxylic acid or anhydride and the reaction temperature is gradually raised to approximately 215° - 225° C and the temperature is held there until the dicarboxylic component has reacted to the point where it is no longer visible in the reaction mixture. Generally, the reaction is continued until the mixture has an alcoholic acid number from about 45 to about 65 whereupon it is cooled and then quenched with a suitable coupling solvent and/or diluent, such as Butyl Cellosolve and t-butyl alcohol to afford the desired alkyd resin. Additionally, the alkyd resins so prepared may be neutralized in any suitable manner with any suitable amine such as for example triethylamine or N,N-dimethylethanolamine and distilled water to provide a clear resin having a substantially neutral pH, i.e., approximately 6.5 - 7.5.

The following examples illustrate the process of the present invention and in no way are intended to limit the scope of this invention. The specific examples below, thus illustrate the water-reducible alkyd resins as embodied herein and process of making same.

EXAMPLE I

A 12 liter round bottom flask was charged with 1105.0 gm of soya oil, 945.0 gm of glycerine, and 600.0 gm of Carbowax 600. The mixture was heated to 205° C using a subsurface nitrogen purge to remove any air present in the reaction vessel. One and five tenths grams of litharge were added, the nitrogen purge removed, and the temperature raised to 230° C where it was maintained for 40 minutes. The reaction mixture was then cooled to 210° C and 2350.0 gm of isophthalic acid were added. The reaction temperature was gradually raised to 225° C while removing any water formed during the esterification process. This temperature was maintained until the isophthalic acid had reacted to the point where it was no longer visible in the reaction mixture. The temperature was then reduced to 215° C. and held there until an alcoholic acid number of 57.8 was attained. The reaction mixture was then cooled to 190° C and quenched with 250.0 gm of Butyl Cellosolve. An additional 869.0 gm of Butyl Cellosolve and 1119.0 gm of t-butyl alcohol were then added to afford an alkyd having a Gardner-Holdt viscosity of Z4–Z5 (25° C), a % NVM of 66.1 (2 hrs. ca 150° C), and an alcoholic acid number of 58.3 (on % NVM). To this resin were added 422.0 gm of triethylamine and 1744.0 gm of distilled water to afford a clear resin having a Gardner-Holdt viscosity of W-X, a % NVM of 50.8 (2 hrs. ca 150° C), and a pH of 7.1.
* See Table A

EXAMPLE 2

A 3 liter round bottom flask was charged with 200.0 gm of safflower oil, 220.0 gm of glycerine, and 120 gm of Carbowax 1540. The mixture was heated to 205° C using a subsurface nitrogen purge to remove any air present in the reaction vessel. Three tenths gm of litharge was added, the nitrogen purge removed, and the temperature raised to 230° C where it was maintained for 30 minutes. The reaction mixture was cooled to 220° C and 460.0 gm of isophthalic acid were added. The reaction temperature was gradually raised to 220° while removing any water formed during the esterification process. This temperature was maintained until the isophthalic acid had reacted to the point where it was no longer visible in the reaction mixture. The temperature was then reduced to 210°-212° C and held there until an alcoholic acid number of 60.8 was attained. The reaction was then cooled to 190° C and quenched with 100.0 gm of Butyl Cellosolve. An additional 90.0 gm of Butyl Cellosolve and 190.0 gm of t-butyl alcohol were then added to afford an alkyd having a Gardner-Holdt viscosity of Z5–Z6 (25° C), a % NVM of 69.7 (2 hrs. ca 150° C), and an alcoholic acid number of 57.2 (on % NVM). To 500.0 gm of this resin were added 11.0 gm Butyl Cellosolve, 11.0 gm t-butyl alcohol, 32.3 gm of triethylamine and 143.0 gm of distilled water to afford a clear resin having a Gardner-Holdt viscosity of U, a % NVM of 50.5 (2 hrs. ca 150° C) and a pH of 7.1.

EXAMPLE 3

A 3 liter round bottom flask was charged with 221.0 gm of safflower oil, 185.0 gm of glycerine, and 100 gm of Carbowax 400. The mixture was heated to 205° C using a subsurface nitrogen purge to remove any air present in the reaction vessel. Three tenths gm of litharge was added, the nitrogen purge removed, and the temperature raised to 230° C where it was maintained for 30 minutes. The reaction mixture was cooled to 220° C and 470.0 gm of isophthalic acid and 24.0 gm of propylene glycol were added. The reaction temperature was gradually raised to 220° C. while removing any water formed during the esterification process. This temperature was maintained until the isophthalic acid had reacted to the point where it was no longer visible in the reaction mixture and the alcoholic acid number was 52.6. The reaction was cooled to 200° C and quenched with 100.0 gm of Butyl Cellosolve. An additional 94.0 gm of Butyl Cellosolve and 194.0 gm of t-butyl alcohol were then added to afford an alkyd having a Gardner-Holdt viscosity of Z4+ (25° C), a % of NVM of 69.3 and an alcoholic acid number of 53.6 (on % NVM). TO 502.0 gm of this resin were added 10.0 gm of Butyl Cellosolve, 10.0 gm of t-butyl alcohol, 31.0 gm of triethylamine, and 150.0 gm of distilled water to afford a clear resin having a Gardner-Holdt viscosity of T, a % NVM of 49.1 (2 hrs. ca 150° C) and a pH of 7.3.

EXAMPLE 4

A 12 liter round bottom flask was charged with 800.0 gm of safflower oil, 780.0 gm of glycerine, and 480.0 gm of Carbowax 1540. The mixture was heated to 205° C using a subsurface nitrogen purge to remove any air present in the reaction vessel. One and two tenths grams of litharge were added, the nitrogen purge removed, and the temperature raised to 230° C. where it was maintained for 40 minutes. The reaction mixture was then cooled to 210° C and 1840.0 gm of isophthalic acid and 100.0 gm of propylene glycol were added. The reaction temperature was gradually raised to 225° C while removing any water formed during the esterification process. This temperature was maintained until the isophthalic acid had reacted to the point where it was no longer visible in the reaction mixture. The temperature was then reduced to 215° C and held there until an alcoholic acid number of 57.0 was attained. The reaction mixture was then cooled to 190° C and quenched with 400.0 gm of Butyl Cellosolve. An additional 376.0 gm of Butyl Cellosolve and 776.0 gm of t-butyl alcohol were then added to afford an alkyd having a Gardner-Holt viscosity of Z3+ (25° C), a % NVM of 69.5 (2 hrs. ca 150° C), and an alcoholic acid number of 55.7 (on % NVM). To this resin were added 286.0 gm of triethylamine and 1499.0 gm of distilled water to afford a clear resin having a Gardner-Holdt viscosity of R-S, a % NVM of 50.0 (2 hrs. ca 150° C), and a pH of 6.5.

EXAMPLE 5

A 12 liter round bottom flask was charged with 1000.0 gm of safflower oil, 1035.0 gm of glycerine, and 600.0 gm of Carbowax 1540. The mixture was heated to 205° C using a subsurface nitrogen purge to remove any air present in the reaction vessel. One and five tenths grams of litharge was added, the nitrogen purge removed, and the temperature raised to 230° C where it was maintained for 40 minutes. The reaction mixture was cooled to 210° C and 2300.0 gm of isophthalic acid and 65.0 gm of diethylene glycol were added. The reaction temperature was gradually raised to 225° C while removing any water formed during the esterification process. This temperature was maintained until the isophthalic acid had reacted to the point where it was no longer visible in the reaction mixture. The temperature was then reduced to 215° C and held there until an alcoholic acid number of 55.2 was attained. The reaction was then cooled to 190° C and quenched with 500.0 gm of Butyl Cellosolve. An additional 470.0 gm of Butyl Cellosolve and 970.0 gm of t-butyl alcohol were then added to afford an alkyd having a Gardner-Holdt viscosity of Z4-(25° C), a % NVM of 69.3 (2 hrs. ca 150° C), and an alcoholic acid number of 55.5 (on % NVM). To this resin were added an additional 127.0 gm of Butyl Cellosolve and t-butyl alcohol, 401.0 gm of triethylamine and 1831.0 gm of distilled water to afford a clear resin having a Gardner-Holdt viscosity of T+, a % NVM of 49.9 (2 hrs. ca 150° C), and a pH of 6.85.

EXAMPLE 6

A 3 liter round bottom flask was charged with 200.0 gm of safflower oil, 195.0 gm of glycerine, and 120.0 gm of Carbowax 1540. The mixture was heated to 205° C using a subsurface nitrogen purge to remove any air present in the reaction vessel. Three tenths gm of litharge was added, the nitrogen purge removed, and the temperature raised to 230° C where it was maintained for 30 minutes. The reaction mixture was cooled to 220° C and 322.0 gm of isophthalic acid and 138.0 gm of phthalic anhydride were added. The reaction temperature was gradually raised to 220° C while removing any water formed during the esterification process. This temperature was maintained until the isophthalic acid had reacted to the point where it was no longer visible in the reaction mixture. The temperature was then reduced to 210°-212° C and held there until an alcoholic acid number of 53.9 was attained. The reaction was then cooled to 190° C and quenched with 100.0 gm of Butyl Cellosolve. An additional 89.0 gm of Butyl Cellosolve and 189.0 gm of t-butyl alcohol were then added to afford an alkyd having a viscosity of Z4-(25° C), a % NVM of 69.4 (2 hrs. ca 150° C), and an alcoholic acid number of 54.8 (on % NVM). To 500.0 gm of this resin were added 13.0 gm Butyl Cellosolve, 13.0 gm t-butyl alcohol, 31.0 gm of triethylamine, and 167.0 gm of distilled water to afford a clear resin having a Gardner-Holdt viscosity of S-T, a % NVM of 50.8 (2 hrs. ca 150° C), and a pH of 7.0.

EXAMPLE 7

A 3 liter round bottom flask was charged with 221.0 gm of soya oil, 12.0 gm of pentaerythritol, 180.0 gm of glycerine, and 120.0 gm of Carbowax 600. The mixture was heated to 205° C using a subsurface nitrogen purge to remove any air present in the reaction vessel. Three tenths gm of litharge was added, the nitrogen purge removed, and the temperature raised to 230° C where it was maintained for 30 minutes. The reaction mixture was cooled to 220° C and 470.0 gm of isophthalic acid were added. The reaction temperature was gradually raised to 220° C while removing any water formed during the esterification process. This temperature was maintained until the isophthalic acid had reacted to the point where it was no longer visible in the reaction mixture. The temperature was then reduced to 210°-212° C and held there until an alcoholic acid number of 64.5 was attained. The reactants were cooled to 190° C and quenched with 100.0 gm of 2/1 n-Butanol/-Cellosolve. An additional 290.0 gm of this solvent combination was then added to afford an alkyd having a Gardner-Holdt viscosity of Z3-Z4 (25° C), a % NVM of 69.3 (2 hrs. ca 150° C), and an alcoholic acid number of 61.0 (on % NVM). To 500.0 gm of this resin were added 38.0 gm of triethylamine, and 155.0 gm of distilled water to afford a clear resin having a Gardner-Holdt viscosity of W-X, a % NVM of 49.8 (2 hrs. ca 150° C), and a pH of 8.0.

EXAMPLE 8

A 12 liter round bottom flask was charged with 844.0 gm of safflower oil, 740.0 gm of glycerine, and 480.0 gm of Carbowax 400. The mixture was heated to 205° C using a subsurface nitrogen purge to remove any air present in the reaction vessel. One and two tenths grams of litharge was added, the nitrogen purge removed, and the temperature raised to 230° C where it was maintained for 40 minutes. The reaction mixture was cooled to 210° C and 184.0 gm of isophthalic acid and 96.0 gm of propylene glycol were added. The reaction temperature was gradually raised to 225° C while removing any water formed during the esterification process. This temperature was maintained until the isophthalic acid had reacted to the point where it was no longer visible in the reaction mixture. The temperature was then reduced to 215° C and held there until an alcoholic acid number of 44.3 was attained. The reaction was then cooled to 190° C and quenched with 400.0 gm of Butyl Cellosolve. An additional 370.0 gm of Butyl Cellosolve and 770.0 gm of t-butyl alcohol were then added to afford an alkyd having a Gardner-Holdt viscosity of Z4-(25° C), a % NVM of 69.1 (2 hrs. ca 150° C), and an alcoholic acid number of 44.8 (on % NVM). To this resin were added an additional 93.0 gm of Butyl Cellosolve and t-butyl alcohol, 228.0 gm of triethylamine and 1531.0 gm of distilled water to afford a clear resin having a Gardner-Holdt viscosity of R, a % NVM of 50.9 (2 hrs. ca 150° C), and a pH of 6.5.

EXAMPLE 9

A 3 liter round bottom flask was charged with 206.0 gm of safflower oil, 190.0 gm of glycerine, and 120.0 gm of Carbowax 600. The mixture was heated to 205° C using a subsurface nitrogen purge to remove any air present in the reaction vessel. Three tenths gm of litharge was added, the nitrogen purge removed, and the temperature raised to 230° C where it was maintained for 30 minutes. The reaction mixture was cooled to 220° C and 460.0 gm of isophthalic acid and 24.0 gm of propylene glycol were added. The reaction temperature was gradually raised to 220° while removing any water formed during the esterification process. This temperature was maintained until the isophthalic acid had reacted to the point where it was no longer visible in the reaction mixture. The temperature was then reduced to 210°-212° C and held there until an alcoholic acid number of 50.4 was attained. The reaction was then cooled to 190° C and quenched with 100.0 gm of Butyl Cellosolve. An additional 92.0 gm of Butyl Cellosolve and 192.0 gm of t-butyl alcohol were then added to afford an alkyd having a Gardner-Holdt viscosity of Z3+ (25° C), a % NVM of 69.7 (2 hrs. ca 150° C), and an alcoholic acid number of 50.7 (on % NVM). To 500.0 gm of this resin were added 10.0 gm Butyl Cellosolve, 10.0 gm t-butyl alcohol, 24.5 gm of triethylamine, and 150.0 gm of distilled water to afford a clear resin having a Gardner-Holdt viscosity of R, a % NVM of 50.1 (2 hrs. ca 150° C), and a pH of 6.5.

EXAMPLE 10

A 3 liter round bottom flask was charged with 211.0 gm. of safflower oil, 247.0 gm of trimethylol ethane, and 120.0 gm of Carbowax 400. The mixture was heated to 205° C using a subsurface nitrogen purge to remove any air present in the reaction vessel. Three tenths gm of litharge was added, the nitrogen purge removed, and the temperature raised to 230° C where it was maintained for 30 minutes. The reaction mixture was cooled to 220° C and 460.0 gm of isophthalic acid and 24.0 gm of propylene glycol were added. The reaction temperature was gradually raised to 220° while removing any water formed during the esterification process. This temperature was maintained until the isophthalic acid had reacted to the point where it was not longer visible in the reaction mixture. The temperature was then reduced to 210-212° C and held there until an alcoholic acid number of 46.4 was attained. The reaction was then cooled to 190° C and quenched with 175.0 gm of Propasol P.* An additional 233.0 gm of Propasol P were then added to afford an alkyd having a Gardner-Holdt viscosity of Z3+ (25° C), a % NVM of 68.8 (2 hrs. ca 150° C), and a alcoholic acid number of 46.1 (on % NVM). To 600.0 gm of this resin were added 19.0 gm of Propasol P, 30.5 gm of triethylamine, and 386.0 gm of distilled water to afford a clear resin having a Gardner-Holdt viscosity of U-V, a % NVM of 40.2 (2 hrs. ca 150° C), and a pH of 7.6.
*Commercial Product (monopropyl ether of propylene glycol)

EXAMPLE 11

This example illustrates the preparation of a typical paint formulation containing the disclosed water reducible short oil alkyd resins. A 600 ml stainless steel beaker was charged with 50 grams of alkyd resin prepared in accordance with the invention and placed under a high speed mixer equipped with a 1 and ¾ inch saw-tooth blade. Approximately 150.0 gm of TiO₂ white pigment were then added to the resin at a moderate rate, and mixed for approximately 5-10 minutes to attain proper pigment dispersion (7-7 ½ on Hagman scale). The mixer speed was lowered and 250.0 gm of said alkyd resin were added along with 15.0 gm of Cymel 303 (cross-linking agent) and 1.5 gms of Catalyst 1010 (p-toluene sulfonic acid in isopropyl alcohol). About 2-4 minutes of mixing were required to insure a completely homogeneous mixture.

Examples 3, 4, 5, 8, 9 and 10 illustrate alternative means of controlling the resins' molecular weight by adding an additional minor amount of described polyol, e.g., propylene glycol or diethylene glycol. The minor amount of polyol may vary from about 1.5 to about 3.5 wt. % based on the total amount of the reactants.

Typical data relative to the subject alkyd resins and their improved characteristics as compared to other alkyd resins is shown in Tables I - VI infra. These data clearly demonstrate the overall excellence of resins embodied in this invention.

A water reducible alkyd resin, prepared in accordance with Example 4, was aged for 45 days at 54° C while being monitored for changes in pH and viscosity. The initial pH and viscosity were respectively 6.5 and 1040 cps. After 45 days at 54° C, the pH was 6.2 and the viscosity was approximately 800 cps. Periodic determinations were also made. The results are present in Table I.

TABLE I

| ALKYD RESIN STABILITY EXAMPLE 4* | | |
|---|---|---|
| Days on Test | Viscosity | pH |
| Start | 1050 | 6.5 |
| 1 | 1050 | 6.4 |
| 2 | 1000 | 6.65 |
| 8 | 850 | 6.40 |
| 9 | 850 | 6.40 |
| 14 | 925 | 6.5 |
| 16 | 850 | 6.5 |
| 17 | 900 | 6.35 |
| 22 | 975 | 6.3 |
| 24 | 950 | 6.4 |
| 49 | 825 | 6.2 |
| 52 | 825 | 6.25 |
| 59 | 800 | 6.2 |

*Total time at 54° C: 45 days

The aged sample (Example 4) was then pigmented and compounded with Cymel 303/Catalyst 1010 (as in Example 11) and the film properties evaluated and compared with the initial results. Very little difference in film properties was observed between the initial and aged sample. The results are presented in Table II.

TABLE II

| ALKYD RESIN STABILITY EXAMPLE 4 (Film Physical Properties) | | |
|---|---|---|
| Substrate: | Alodine 1200 Treated Aluminum | |
| Bake: | 15 minutes ca 325° F | |
|  | Initial | After 45 days at 54° C |
| Dry Film Thickness (mils) | .74-.84 | .7-.8 |
| Pencil Hardness | H-2H | H-2H |
| Tukon (KHN) Hardness | 4.3 | 7.3 |
| Gloss 60° | 96 | 89 |
| Cross Hatch Adhesion | Exc. | Exc. |
| MEK Double Rubs | >200 | >200 |
| Reverse Impact (in./lb.) | 20 | 12 |
| Flexibility (T bend) | 4T | 5T |

The water reducible alkyd resin composition of Example 2 was formulated into a paint, according to the procedure of Example 11 and its film physical properties compared in Table III with paints prepared from two commercially available water reducible alkyds.

TABLE III

| Relative Film Properties of Alkyd Paints Based on Example 2 and Commercial Water Based Alkyds | | | |
|---|---|---|---|
| Substrate: | Alodine 1200 Treated Aluminum | | |
| Bake: | 15 minutes ca 325° F. | | |
|  | Alkyd from Example 2 | Commercial[1] Alkyd #1 | Commercial[2] Alkyd #2 |
| Surface Appearance | high gloss slight cratering | yellow col. slight cratering | high gloss very slight cratering |
| Dry Film Thickness (mils) | .90-.95 | .88-.95 | .85-.95 |
| Pencil Hardness | H-2H | H-2H | 3H-4H |
| Tukon (KHN) Hardness | 4.0 | 6.5 | 23.5 |

TABLE III-continued

Relative Film Properties of Alkyd Paints Based on Example 2 and Commercial Water Based Alkyds Substrate: Alodine 1200 Treated Aluminum
Bake: 15 minutes ca 325° F.

|  | Alkyd from Example 2 | Commercial[1] Alkyd #1 | Commercial[2] Alkyd #2 |
|---|---|---|---|
| Gloss 60 | 95 | 92 | 87 |
| Cross Hatch Adhesion | excellent | excellent | excellent |
| MEK Double Rubs | >200 | 200 | >200 |
| Reverse Impact (in./lb) | 18 | 16 | 0 |
| Flexibility (T bend) | 5T | 7T | >7T |

[1]Commercially available from Ashland Chemical Company
[2]Commercially available from Cargil Inc. - Chemical Products Division.

The package stability of these three paints was then monitored for 12 days at 54° C by following changes in pH and viscosity, and some of the film properties described in Tables II and III.

It was found that the paint prepared from Commercial Alkyd No. 2 had poor stability and was not usable after less than three days at about 54° C. The alkyd from Example 2 and Commercial Alkyd No. 1 were quite stable. However, the generally more acceptable hardness — flexibility characteristics of the alkyd from Example 2 can be seen from an examination of Table IV.

the case of air dried coatings, or the resins may be combined or blended with other suitable resins to form superior coating compositions.

The effect of the crosslinking resin on the subject alkyd short oil resins was evaluated as follows (any suitable crosslinking agent may be used). Five commercial crosslinking resins* were evaluated with the alkyd from Example 1 to determine their effect on film physical properties and to demonstrate the excellent utility of such coating formulations:

Here from American Cyanimid

The five crosslinking resins tested were:
Agent 1. Methylated melamine
Agent 2. Ethylated melamine
Agent 3. Butylated melamine
Agent 4. Hexylated melamine
Agent 5. Methylated benzoguanamine Film physical properties were tested over Alodine 1200 treated aluminum and over blackplate. Coatings were prepared using 10 parts of melamine per 100 of alkyd resin solids by weight and 1 phr Catalyst 1010. All samples were pigmented with DuPont's TiPure R-900 and prepared according to the procedure of Example 11. Panels were prepared by drawdown and baked 15 minutes at 325° F. Results are presented in Tables V and VI. The generally excellent film performance of our formulations is clearly shown.

TABLE IV

PACKAGE STABILITY OF PAINTS AGED CA. 54° C.

|  | Alkyd from Ex. 2 | | | Commercial Alkyd #1 | | | Commercial Alkyd #2 | | |
|---|---|---|---|---|---|---|---|---|---|
| Days Aged | 3 | 8 | 12 | 3 | 8 | 12 | 3 | 8 | 12 |
| pH | 7.0 | 6.9 | 6.9 | 7.0 | 6.9 | 6.9 | 7.1 | 7.0 | 6.8 |
| Viscosity (cps) | 4600 | 3800 | 3400 | 3400 | 2500 | 2500 | 2200 | 1900 | 1800 |
| Pencil Hardness | H-2H | H-2H | H-2H | H-2H | H-2H | H-2H | 4H | 4H | 4H |
| TUKON (KHN) | 9 | 6 | 8 | 12 | 8 | 10 | 26 | 25 | 20 |
| Reverse Impack (in/lb) | 12 | 12 | 12 | 5 | 8 | 8 | 0 | 0 | 0 |
| Flexibility (T-Bend) | 7 | 5 | 5 | 8 | 8 | 8 | >8 | >8 | >8 |

Coating formulations (paint vehicles) comprising the subject resins may consist entirely of said resins, as in

TABLE V

ALKYD RESIN FROM EXAMPLE I
Melamine Crosslinking Agent ca. 10 phr.
Cat. 1010 ca 1 phr.

Substrate: Alodine 1200 Aluminum
Bake: 15 min 325° F.

| Coating Identification | Paint + Agent 1 | Paint + Agent 2 | Paint + Agent 3 | Paint + Agent 4 | Paint + Agent 5 |
|---|---|---|---|---|---|
| Surface appearance | hi-gloss slight cratering | hi-gloss slight cratering | hi-gloss very slight cratering | hazy slight cratering | hi-gloss some cratering |
| Dry Film Thickness (mils) | .8-.85 | .85-.95 | .8-.9 | .8-.9 | .8-.9 |
| Pencil Hardness | H-2H | H-2H | HB-F | HB-F | H-2H |
| Tukon (KHN) | 3.5 | 1.8 | 1.3 | 0.65 | 1.8 |
| Gloss 60° | 96 | 94 | 95 | 78 | 95 |
| Cross Hatch Adhesion | exc. | exc. | exc. | exc. | exc. |
| MEK Double Rubs | >200 | >200 | 200 | 200 | 200 |
| Reverse Impact (in/lb) | 18 | 24 | 32 | 32 | 28 |
| Flexibility (T-bend) | 4T | 4T | 3T | 2T | 3T |

TABLE VI

ALKYD RESIN FROM EXAMPLE I
Melamine Crosslinking Agent ca. 10 phr.
Cat. 1010 ca 1 phr.

Substrate: Blackplate
Bake: 15 min - 325° F.

| Coating Identification | Paint + Agent 1 | Paint + Agent 2 | Paint + Agent 3 | Paint + Agent 4 | Paint + Agent 5 |
|---|---|---|---|---|---|
| Surface appearance | hi-gloss some cratering | hi-gloss slight cratering | hi-gloss very slight cratering | hazy slight cratering | hi-gloss some cratering |
| Dry Film Thickness (mils) | .8-.9 | .85-.95 | .8-.9 | .8-.9 | .85-.95 |

TABLE VI-continued

ALKYD RESIN FROM EXAMPLE I
Melamine Crosslinking Agent ca. 10 phr.
Cat. 1010 ca 1 phr.

Substrate: Blackplate
Bake: 15 min - 325° F.

| Coating Identification | Paint + Agent 1 | Paint + Agent 2 | Paint + Agent 3 | Paint + Agent 4 | Paint + Agent 5 |
|---|---|---|---|---|---|
| Pencil Hardness | H-2H | H-2H | H-2H | H-2H | H-2H |
| Tukon (KHN) | 6.0 | 4.9 | 2.8 | 2.7 | 2.8 |
| Gloss 60° | 94 | 93 | 93 | 83 | 95 |
| Cross Hatch Adhesion | exc. | exc. | exc. | exc. | exc. |
| MEK Double Rubs | >200 | >200 | 200 | 200 | 200 |
| Reverse Impact (in/lb.) | 20 | 40 | 36 | 36 | 32 |
| Flexibility | 4T | 4T | 3T | 3T | 3T |

Although the examples disclosed and/or exemplified are the preferred embodiments of this invention, variations or modifications apparent to one skilled in the art are intended to be within the scope of this invention.

We claim:

1. A water reducible short oil alkyd resin consisting essentially of the reaction product of from about 10-15 wt. % based on the total weight of the reactants of a polyethylene glycol having a molecular weight between about 200-2000; from about 20-25 wt. % based on the total weight of the reactants of a triglyceride having from about 30-60 carbon atoms; from about 18-23 wt. % based on the total weight of the reactants of a polyol having from about 2 to about 6 hydroxy groups; and from about 43-48 wt. % based on the total weight of the reactants of an aromatic dicarboxylic acid or anhydride having from about 8-12 carbon atoms; said resin having an alcoholic acid number between about 45 and about 65.

2. The resin of claim 1 wherein the polyethylene glycol has a molecular weight of from about 380-420; the triglyceride is selected from the group consisting of Safflower Oil and Soya Oil; the polyol is glycerine; and the dicarboxylic acid is isophthalic acid.

3. The resin of claim 1 wherein the polyethylene glycol has a molecular weight of from about 570-630; the triglyceride is selected from the group consisting of Safflower Oil and Soya Oil; the polyol is glycerine; and the dicarboxylic acid is isophthalic acid.

4. The resin of claim 3 wherein the triglyceride is Soya Oil.

5. The resin of claim 1 wherein the polyethylene glycol has a molecular weight of from about 1300-1600; the triglyceride is selected from the group consisting of Safflower Oil and Soya Oil; the polyol is glycerine; and the dicarboxylic acid is isophthalic acid.

6. The resin of claim 5 wherein the triglyceride is Safflower Oil.

7. The resin of claim 1 comprising the following reactants: polyethylene glycol having a molecular weight between about 400-1500, Soya Oil or Safflower Oil, glycerine and isophthalic acid.

8. A process for the preparation of a water reducible short oil alkyd resin consisting essentially of initially reacting a polyethylene glycol having a molecular weight between about 200-2000 in an amount between about 10-15 wt. % based on the total weight of the reactants; a $C_{30}$-$C_{60}$ triglyceride in an amount between about 18-23 wt. % based on the total weight of the reactants; and a polyol having from about 2-6 hydroxy groups in an amount between about 15-20 wt. % based on the total weight of the reactants at a temperature between about 200° C. and 230° C. for about 30-40 minutes; and subsequently reacting the product with a $C_8$-$C_{12}$ dicarboxylic acid or anhydride in an amount between about 43-48 wt. % based on the total weight of the reactants at a temperature between about 215° C. and about 225° C., until an alcoholic acid number between about 45 and about 65 is attained.

9. The process of claim 8 wherein the polyethylene glycol has a molecular weight between about 350-1500, the triglyceride is selected from the group consisting of Soya Oil and Safflower Oil; the aromatic dicarboxylic component is selected from the group consisting of isophthalic acid and phthalic anhydride, and the polyol is selected from the group consisting of glycerine and propylene glycol.

10. The process of claim 9 wherein the polyol is glycerine; and the aromatic dicarboxylic component is isophthalic acid.

11. A paint vehicle containing a water reducible alkyd resin as defined in claim 1.

12. A paint vehicle as defined in claim 11 containing a suitable crosslinking agent.

* * * * *

UNITED STATES PATENT AND TRADEMARK OFFICE
CERTIFICATE OF CORRECTION

PATENT NO. : 4,051,089
DATED : September 27, 1977
INVENTOR(S) : MICHAEL A. TOBIAS and CARLOS J. MARTINEZ It is certified that error appears in the above-identified patent and that said Letters Patent are hereby corrected as shown below:

| | |
|---|---|
| Column 3, line 25 | After "600" insert --*--. |
| Column 4, line 35 | "TO" should be --To--. |
| Column 8, line 14 | "present" should be --presented--. |
| Column 10, line 11 | Before "Here" insert --*--. |

Signed and Sealed this

Twenty-eighth Day of March 1978

[SEAL]

Attest:

RUTH C. MASON
Attesting Officer

LUTRELLE F. PARKER
Acting Commissioner of Patents and Trademarks